US012717743B2

(12) United States Patent
Mishra et al.

(10) Patent No.: US 12,717,743 B2
(45) Date of Patent: Aug. 25, 2026

(54) ROUND ROBIN BUS ARBITRATION WITH CONTROL VECTORS AND INCREMENT AND DECREMENT FUNCTIONS

(71) Applicant: Signature IP Corporation, Milpitas, CA (US)

(72) Inventors: Kishore Mishra, Santa Clara, CA (US); Ralfael Himor, Manila City (PH); Michael Loe Fernandez, Quezon City (PH)

(73) Assignee: Signature IP Corporation, Milpitas, CA (US)

( * ) Notice: Subject to any disclaimer, the term of this patent is extended or adjusted under 35 U.S.C. 154(b) by 38 days.

(21) Appl. No.: 19/008,737

(22) Filed: Jan. 3, 2025

(65) Prior Publication Data

US 2025/0225093 A1 Jul. 10, 2025

Related U.S. Application Data

(60) Provisional application No. 63/688,925, filed on Aug. 30, 2024, provisional application No. 63/663,205, filed on Jun. 24, 2024, provisional application No. 63/643,941, filed on May 8, 2024, provisional application No. 63/551,091, filed on Feb. 8, 2024, provisional application No. 63/617,823, filed on Jan. 5, 2024.

(51) Int. Cl.

*G06F 13/37* (2006.01)
*G06F 13/364* (2006.01)

(52) U.S. Cl.

CPC ............ *G06F 13/37* (2013.01); *G06F 13/364* (2013.01); *G06F 2213/36* (2013.01)

(58) Field of Classification Search

CPC ..... G06F 13/37; G06F 2213/36; G06F 13/364
See application file for complete search history.

(56) References Cited

U.S. PATENT DOCUMENTS

| | | | |
|---|---|---|---|
| 6,892,328 | B2 | 5/2005 | Klein et al. |
| 8,533,545 | B2 | 9/2013 | Goyal et al. |
| 8,621,301 | B2 | 12/2013 | Goyal et al. |
| 9,436,491 | B1 | 9/2016 | Chiou |
| 9,836,384 | B2 | 12/2017 | Leinfellner et al. |
| 10,114,658 | B2 | 10/2018 | Huang et al. |
| 10,250,721 | B2 | 4/2019 | Massa et al. |
| 10,282,315 | B2 | 5/2019 | Siva et al. |
| 10,348,563 | B2 | 7/2019 | Rao et al. |
| 10,547,514 | B2 | 1/2020 | Rao et al. |

(Continued)

*Primary Examiner* — Tammara R Peyton
(74) *Attorney, Agent, or Firm* — Adams Intellex, PLC

(57) ABSTRACT

Techniques for round robin bus arbitration are disclosed. A plurality of bus requesters is coupled to a common bus by an arbitration logic. Bus access requests are stored in a request vector (RV). A grant history vector (GHV) that contains the last granted requester is checked. A relative request vector (RRV) is created by performing N circular shifts in a right direction until the last granted requester occupies a first bit position in the RRV. The RRV is examined for the first asserted bit beginning with a second bit position in the first direction. A one-hot encoded relative grant vector (RGV) is generated based on the first asserted bit in the RRV. A grant vector (GV) is produced by executing N circular shifts of the RGV in a left direction. Access is granted to the bus requester indicated by the GV.

25 Claims, 10 Drawing Sheets

(56) References Cited

U.S. PATENT DOCUMENTS

| | | | | |
|---|---|---|---|---|
| 10,740,523 | B1 | 8/2020 | Klein | |
| 10,911,323 | B2 | 2/2021 | Hiers et al. | |
| 11,010,322 | B1 | 5/2021 | Morshed | |
| 11,657,203 | B2 | 5/2023 | Cherif et al. | |
| 11,782,834 | B2 * | 10/2023 | Chuan ................. | G06F 12/0828 711/141 |
| 2022/0018901 | A1 | 1/2022 | Jones et al. | |
| 2022/0210030 | A1 | 6/2022 | Cherif et al. | |
| 2023/0015543 | A1 | 1/2023 | Chen et al. | |
| 2023/0105677 | A1 | 4/2023 | de Lescure et al. | |
| 2025/0258721 | A1 * | 8/2025 | Himor ................... | G06F 13/364 |

* cited by examiner

ROUND ROBIN BUS ARBITRATION WITH CONTROL VECTORS AND INCREMENT AND DECREMENT FUNCTIONS

RELATED APPLICATIONS

This application claims the benefit of U.S. provisional patent applications "Round Robin Bus Arbitration With Control Vectors and Increment And Decrement Functions" Ser. No. 63/617,823, filed Jan. 5, 2024, "Weighted Round Robin Bus Arbitration With Control Vectors And Increment And Decrement Functions" Ser. No. 63/551,091, filed Feb. 8, 2024, "Coupling Network-On-Chip Sub-Topologies With Derivative Clocks" Ser. No. 63/643,941, filed May 8, 2024, "Cloud-Native Network-On-Chip Validation With Sub-Topologies" Ser. No. 63/663,205, filed Jun. 24, 2024, and "Cloud-Native Network-On-Chip Validation Including Sub-Topologies" Ser. No. 63/688,925, filed Aug. 30, 2024.

Each of the foregoing applications is hereby incorporated by reference in its entirety.

FIELD OF ART

This application relates generally to electronics and more particularly to a round robin bus arbitration with control vectors and increment and decrement functions.

BACKGROUND

Sharing of resources is a universal trait among humans and has been a factor in human relationships throughout the history of mankind. An example of resource sharing can be a scenario where two or more people agree to live in the same dwelling. The space within the dwelling can be shared to allow each person to understand what privileges are accorded and what responsibilities are expected. The total space can be divided and allocated to each occupant, after which they can agreeably occupy the space and store their household belongings. Another simple example of resource sharing can be observed in a grocery store. Grocery shelves can be an important element of the business model. The availability of shelf space and the location of the shelf space within the store can play a significant role in the success of products competing for a shopper's attention. There is typically a finite amount of shelf space allocated to each product that is for sale. The actual amount of shelf space allotted to each product can be carefully decided based on historical product trends, customer set, time of year, and other factors. Products are then placed in a fashion so as to be given sufficient viewing and recognition by a customer.

There can be multiple examples of resource sharing in an office building. Floorspace can be shared among many uses such as public spaces, conference rooms, public and private office space, and so on. The shared floorspace can be divided accordingly for the various uses. Among the uses is the floorspace granted to offices. Employees can then be assigned to the offices. Some offices can be shared among two or more occupants. Within such offices, some occupants might be located near the doorway while others might be situated farther from the door. In the office, job sharing can sometimes be operative where two or more workers can be assigned to fulfill a single job assignment, each on a part time basis. In that scenario, job requirements must be divided according to a plan. Additionally, the job requirements and performance targets can be related to a financial budget that is shared by other projects, where each project can be expected to meet the requirements for successful sharing.

Resource sharing can involve holding a resource with another person and can be important in private life, corporate life, and other settings. The benefits of resource sharing are numerous and can allow multiple objectives to be achieved at once. This idea applies to compute resources as well. For example, processor-intense simulations can be spread across many computers when they are not in use by others. The benefits of this resource sharing can include the ability to generate a critical result with much less time and money. Despite the many benefits, resource sharing involves giving as well as taking, and giving has often been found troublesome to humans. Still, the many advantages will likely drive additional sharing of resources in the future.

SUMMARY

A device cannot successfully access bus resources simultaneously with another device on a common bus. Shared interconnected devices on a bus can be managed to avoid bus congestion, data collision, and other issues. A device that requires access to a bus can be a bus requester. In a computer system, two or more bus requesters can make simultaneous requests for the same bus. Requests for bus access can be arbitrated to methodically manage timely access, access for all devices, and so on. Bus arbitration can manage multiple processors to communicate with each other, with shared memory, with peripherals, and so on. Improvements can be realized when device access to the bus can be assigned a priority based on previous access history. Disclosed embodiments include round robin bus arbitration with control vectors and increment and decrement functions.

Techniques for round robin bus arbitration are disclosed. A plurality of bus requesters is coupled to a common bus by an arbitration logic. Bus access requests are stored in a request vector (RV). A grant history vector (GHV) that contains the last granted requester is checked. A relative request vector (RRV) is created by performing N circular shifts in a right direction until the last granted requester occupies a first bit position in the RRV. The RRV is examined for the first asserted bit beginning with a second bit position in the first direction. A one-hot encoded relative grant vector (RGV) is generated based on the first asserted bit in the RRV. A grant vector (GV) is produced by executing N circular shifts of the RGV in a left direction. Access is granted to the bus requester indicated by the GV.

A processor-implemented method for resource sharing is disclosed comprising: accessing a plurality of bus requesters, wherein the plurality of bus requesters is coupled to a common bus by an arbitration logic; requesting, by at least one bus requester, access to the common bus, wherein the requesting is stored in a request vector (RV); checking a grant history vector (GHV), wherein the GHV indicates a last granted requester within the plurality of bus requesters; creating a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed; examining a first asserted bit within the RRV, wherein the examining begins at a second bit position within the RRV, wherein the examining proceeds in a first direction; generating a relative grant vector (RGV), wherein the RGV is based on the first asserted bit within the RRV, wherein the RGV comprises a one-hot encoding; producing a grant vector (GV), wherein the producing includes executing N circular shifts of the RGV, wherein a direction of the executing N circular shifts is in a left direction; and granting access, by the arbitration logic, of the common bus to a bus requester indicated by the GV. In embodiments the checking, the creating, the examining, the generating, and the producing are based on an incrementing function. In other embodiments the checking, the creating, the examining, the generating, and the producing are based on a decrementing function. Embodiments include storing the GV as a new GHV. In embodiments the checking, the creating, the examining, the generating, and the producing are implemented in combinational logic within the arbitration logic. In embodiments, the checking, the creating, the examining, the generating, and the producing occur in a single clock cycle. In embodiments, the performing one or more circular shifts on the RV includes completing the one or more circular shifts when the last granted requester occupies a most significant bit position within the RRV. In embodiments, the creating comprises assigning the RV to the RRV, wherein the last granted requester bit occupies the first bit position within the RV.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
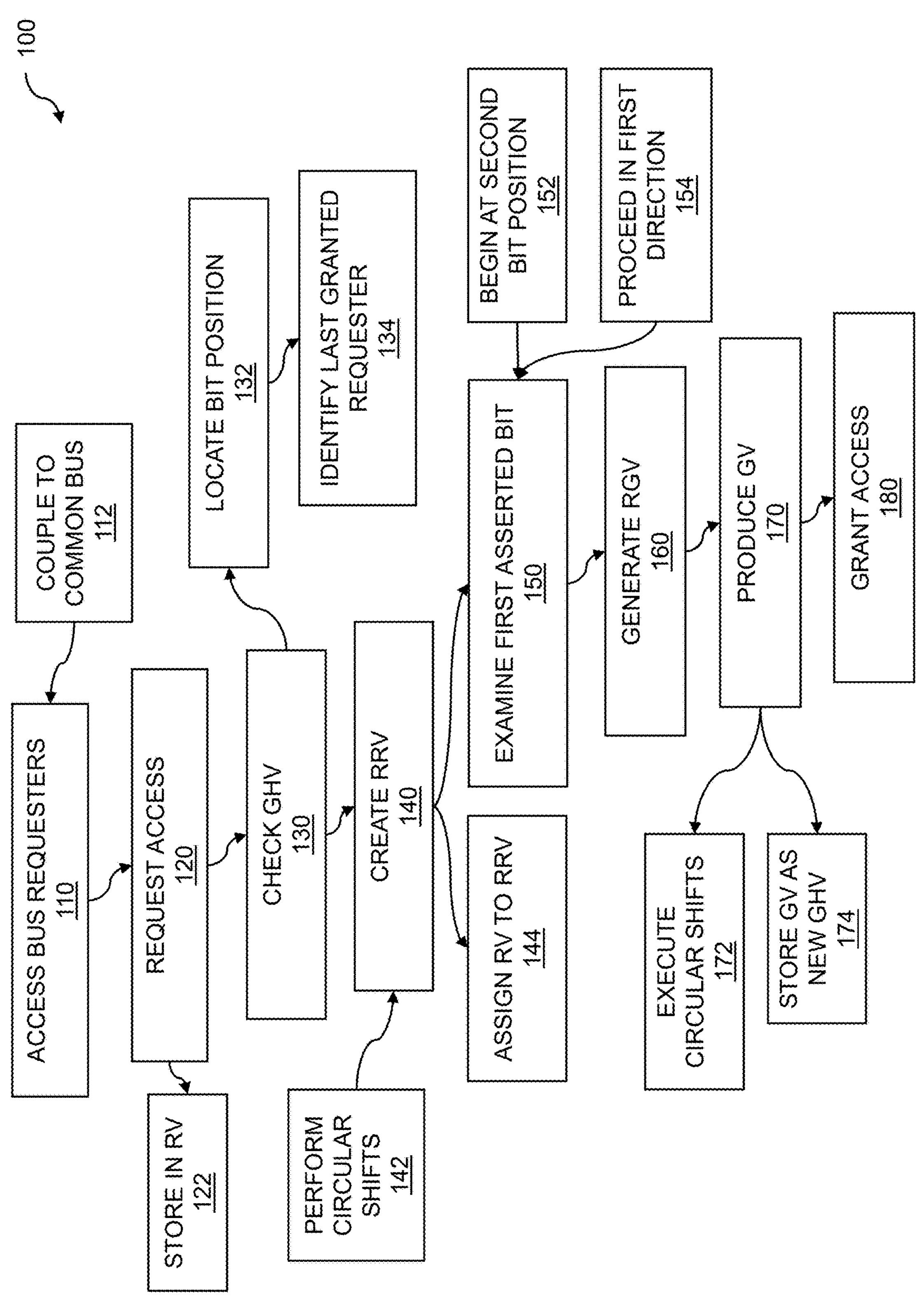
FIG. 1 is a flow diagram for round robin bus arbitration with control vectors and increment and decrement functions.

Components in a computing system can be interconnected with other components through a bus. A bus can be a communication path through which information is transferred between two or more components of a computer. Computing information can include data, addresses, commands, controls, and so on. Bus structures have become ubiquitous in computers, control systems, and so on. Bus structures can include common buses that are shared by two or more devices that need access to interconnected resources. Such devices and resources can include one or more levels of memory, additional central processing unit (CPU) cores, peripheral devices, input-output (I/O) devices, and so on. Memory can include cache and local static and dynamic semiconductor memory, graphics processing unit (GPU) memory, spinning and solid state secondary memory, and other types. Physical bus structures can include on-chip interconnects, copper, fiber optic, and other components. Historical bus structures have included parallel buses where a plurality of signals is carried simultaneously and synchronously between a source and destination. Increases in bus speed can favor designs that reduce the number of parallel paths, allow operation at very high speeds, reduce the complexities of synchronization, and so on. Improvements in bus capacity can be realized when high-speed, differential pair, serial transmission schemes replace lower-speed parallel bus topologies. Bus transactions can include packetized traffic. High-speed industry standard bus protocols and physical implementations can include PCI Express (Peripheral Component Interconnect Express or PCI-E), Compute Express Link (CXL), Ethernet, Universal Serial Bus (USB), and so on.

A computing system bus can be a communication path through which information is transferred between two or more components of a computer system. Computing information can include data, addresses, commands, controls, and so on. Buses have become almost universal in computers, control systems, and so on. Buses can include hardware related elements such as wires, fiber, and other conductors. At other computing levels, buses can include software communication protocols such as rules, communications synchronization, error detection, error correction, error recovery, and so on. Bus implementations in a computer system can include common buses. Common buses can be shared by two or more devices that need access to interconnected resources. Resources typically instituted in computer systems can include one or more memories, one or more processor cores, one or more peripheral devices such as input-output devices, and so on.

Memories can include one or more levels of cache memory such as random access memory (RAM), dynamic random access memory (DRAM), and so on. Memories can include primary memories implemented with RAM, DRAM, and so on. Memories can also include secondary memories which can be implemented as non-volatile solid state memory devices, non-volatile spinning memory devices, and so on. Memories can be volatile in which data is lost when power is removed, or non-volatile in which data is retained when power is removed. Memories can be connected to a bus physically, electrically, logically, and so on. Memory devices on a common bus must have cooperative relationships for successful operation.

Processor cores can execute instructions of a software program. Instructions can include logic processes, arithmetic computations, control processes, and I/O operations. For example, a processor design can include an arithmetic logic unit (ALU) that processes arithmetic and logical operations, and a set of registers that can contain input operands for the ALU and output results from the ALU. A processor design can further include control circuitry that coordinates the fetching and decoding of instructions from memory, the fetching of data from memory, the processing of instructions and data, and so on. Modern processor cores can be implemented in semiconductor chip platforms and can contain a plurality of internal common buses, external common buses, and so on. A common bus can be located within a processor core, between cores on a multi-core processor, between cores/multi-processor cores on a system-on-a-chip (SoC), between SoCs, and so on. Processor cores can be connected to a bus physically, electrically, logically, and so on. Connected processor cores on a common bus must have cooperative relationships for successful operation.

Peripheral devices can include additional storage devices such as removable transient storage devices, graphics processing units (GPUs), external bus interface devices, memory expansion units, external memory interfaces, bus diagnostics units, bus protocol translation units, wireless communications interfaces, human interface devices (HIDs), and so on. HIDs can include keyboards, displays, etc. Peripheral devices can be connected to a bus physically, electrically, logically, and so on. Connected peripheral devices on a common bus must have cooperative relationships for successful operation. High-speed, serial, industry standard bus protocols and physical implementations can include PCI Express (Peripheral Component Interconnect Express or PCI-E), Compute Express Link (CXL), Ethernet, Universal Serial Bus (USB), and so on. Historically, bus structures have included parallel groups of electrical wires where a plurality of signals is carried simultaneously and synchronously between source hardware and destination hardware. Increases in bus speed have favored designs that reduce the number of parallel paths, allow operation at very high speeds, reduce the complexities of synchronization, and achieve other improvements. In addition to the physical bus implementations, bus design can include logical implementations that allow the interconnection of two or more devices. Improvements in bus capacity can be realized when high-speed, differential pair, serial transmission schemes replace lower-speed parallel bus topologies. High speed bus transactions can often include packetized traffic which can avoid the inefficiencies that result from pre-allocated bus bandwidth. Packetized communications can allow a bus to be occupied, used, and efficiently released for other related or unrelated traffic. PCI-E, CXL, Ethernet, USB, and other buses are examples of industry protocols that employ packetized communications.

PCI Express (Peripheral Component Interconnect Express), or PCI-E, is a common interface that is used for communication between electrical components, motherboards and daughtercards, and so on. A PCI-E bus can include one or more lanes, where each lane is comprised of a send and receive lane. Data traffic in a lane can operate at high speeds, sometimes in the gigabit-per-second range for PCI-E bus devices. PCI-E logic can be included in a chipset form or, with trends in die-shrink and transistor density, can be incorporated directly within the CPU to reduce signal latency and increase speed. Another bus standard that is similar to PCI-E is the Compute Express Link (CXL). CXL was designed for high-speed interconnection between a CPU and an endpoint device, CPU-to-memory interconnect, and so on. The Universal Serial Bus (USB) is also a serial bus standard. At the electrical level, a USB can include a single differential pair of conductors, or two or more pairs of conductors that operate at significantly higher transmission speeds. The Ethernet networking technology is commonly found in local area networks (LANs), wide area networks (WANs), and other communications topologies.

A device cannot successfully occupy and consume bus resources simultaneously with another device on a common bus. Shared interconnected devices on a bus can be managed to avoid bus congestion, data collision, and other issues. A device that requires access to a bus can be a bus requester. In a typical computer system, there can be simultaneous requests for bus access from two or more bus requesters. Requests for bus access can be arbitrated to methodically manage timely access; allow access for all devices; allow multiple processors to communicate with each other, with shared memory, or with peripherals; and so on. A typical methodology for bus arbitration can employ the concept of round robin. A round robin methodology can be used to choose the ordering of the elements in a group of elements, where each element is given a chance, in turn, to participate. Round robin can also be referred to as taking turns. Round robin often includes the return back to the beginning of the group of elements for repeated additional selection and participation. For certain operations, the contents of the word between MSB and LSB may be a single instance of a one in a field of zeros, or a single instance of a zero in a field of ones. This is referred to as one-hot encoding. One-hot encoding can be useful because the state of the word can be immediately known without the need for a binary decode operation. One-hot encoding can be useful for fast processing of logic and other functions. One-hot encoding can be useful for logic that is implemented in combinational logic. Combinational logic can be implemented as a collection of Boolean circuits where the output is based on the present inputs and is not based on past state history. Combinational logic can often perform in a single clock cycle and can therefore be fast compared to a state machine that factors past history into the processing.

Fast performance can be a significant factor in bus traffic. In typical computer systems, a round robin arbitration scheme can be implemented to ensure that multiple bus requesters obtain access to the bus. However, performance problems can occur when one bus gains priority of the bus over other requesters. For example, in a typical arbitration scheme, requester A is granted access to a common bus when it has a request. If requester A does not have a request, requester B is granted access to the bus when requester B has a request. A problem with this scheme is that requester A is always granted access to the bus when it has a request. This can lead to code blocking, task starvation, and bottlenecks in other parts of the system. A common solution to this problem has been to implement multiple nested if/then loops in software so that the arbitration scheme always proceeds to the next requester in the following round of arbitration. But these schemes can be costly to implement in combinational logic, state machines, and so on. Disclosed embodiments provide a unique, easy to implement arbitration scheme with incrementing and decrementing priority, eliminating bottlenecks caused by other simple arbitration schemes. Disclosed embodiments can include control vectors such as a request vector (RV), a grant history vector (GHV), a relative request vector (RRV), a relative grant vector (RGV), and/or a grant vector (GV). Other vectors can be utilized. Disclosed embodiments provide a system wherein fair access to a bus is provided for one or more requesters that prevents a single requester from dominating bus access. Because of simplicity of implementation, additional embodiments allow access grants to be decided in one cycle, which can be a significant performance improvement over typical bus arbitration schemes.

In disclosed embodiments, a plurality of bus requesters can be accessed. The plurality of bus requesters can be coupled to a common bus by an arbitration logic. At least one bus requester in the plurality of bus requesters can request access to the common bus. The request from the bus requester can be stored in a request vector (RV). A grant history vector (GHV) can be checked. The GHV can indicate a last granted requester within the plurality of bus requesters. A relative request vector (RRV) can be created. The creating can include performing one or more circular shifts on the RV while the last granted requester does not occupy a first bit position within the RV. The direction of the one or more circular shifts is in a right direction, where N represents the number of circular shifts performed. Starting from a second bit position within the RRV, and proceeding in a first direction, the first asserted bit within the RRV can be examined. A relative grant vector (RGV) can be generated in a one-hot format, where the single bit in the vector is based on the first asserted bit within the RRV. A grant vector (GV) can be produced from the RGV by executing N circular shifts of the RGV in a lefthand direction. The arbitration logic can then grant access to the common bus for the bus requester indicated by the GV. Embodiments include the direction of the circular shifts, which can be accomplished in an incrementing or decrementing direction. Further embodiments include encoding the GV in a one-hot format. Other embodiments include storing the GV as the new GHV. Embodiments include the execution of the aforementioned process in combinational logic in the arbitration logic, and in a single clock cycle. The following figures and descriptions will define certain terms that can bring clarity to the aforementioned sequence.

FIG. 1 is a flow diagram for round robin bus arbitration with control vectors and increment and decrement functions. Disclosures include a processing methodology that allows a system to assign bus access to a requester within a plurality of requesters in a way that prevents a single requester from dominating bus access. Additional embodiments allow access grants to be decided in one cycle. Requests are made by devices on the bus that want access to the bus. Access can include memory access, CPU core access, and so on. The disclosed techniques can process the requests by factoring in past request history, and can grant access to the next requester. The flow 100 includes accessing a plurality of bus requesters 110, wherein the plurality of bus requesters is coupled to a common bus 112 by an arbitration logic. Bus requesters can include devices that are coupled to a common bus. Connected bus requesters can include one or more devices that need to access one or more memories, one or more processors, one or more input-output devices, and so on. Common buses can include buses that are internal or external to a computer system. Common buses can further include parallel buses that carry data words in parallel. Common buses can also include serial buses that carry data one bit at a time, sequentially, over a communications path. In embodiments, a common bus comprises a PCI-E bus. In further embodiments, the common bus comprises a compute express link (CXL) bus. In other embodiments, the common bus comprises an ethernet bus. In additional embodiments the common bus comprises a universal serial bus (USB). A common bus can comprise other high speed bus structures and protocols. Arbitration logic in disclosed embodiments can coordinate accesses to the common bus by the various bus requesters. Arbitration logic can be implemented in software, hardware, or a combination of the two. Arbitration logic can be implemented as a single centralized logic structure that performs bus arbitration across the entire set of connected bus requesters. Arbitration logic can also be implemented as a distributed system of logic that includes the connected bus requesters in the arbitration process.

The flow 100 includes requesting 120, by at least one bus requester, access to the common bus, wherein the requesting is stored in a request vector (RV) 122. A bus requester can request access to the common bus. The requesting access can be required by the requesting device to send or receive communications on the bus. One or more requesters can request access to the common bus at the same time. A bus request can be retained for use in bus arbitration. A bus request can be stored in a request vector (RV) 122. An RV can comprise one or more bits and can be implemented in software, hardware, or both. An RV can be on-chip register space, on-chip memory space, external memory space, and so on. An RV can have each bit of its one or more bit positions assigned to a requesting device. As an example, a common bus can be coupled to four processor cores and a memory element. In this case, the RV can include four bits. The first bit can be the rightmost bit of the four bits and can be a least significant bit (LSB). The LSB can be assigned to a first processor. The next bit to the left, the second bit, can be assigned to a second processor. The third and fourth bits can be assigned to other processor cores. In this example, the first processor can execute instructions that can require an access to the memory element on the common bus. As a result, the first bit in the RV can contain a "1". If the second CPU also requires access to the memory through the common bus, the second bit in the RV can also contain a "1". The RV can be an input signal that can be used by disclosed embodiments to coordinate and grant access to requesting devices for access to the common bus.

The flow 100 includes checking a grant history vector (GHV) 130, wherein the GHV indicates a last granted requester within the plurality of bus requesters. The indicating can be accomplished by a bit set to a "1" in the GHV. The identity of a last granted bus requester, of one or more bus requesters, can be stored in a GHV. In embodiments, the GHV comprises a number of bits, wherein the number of bits is equal to a number of bus requesters in the plurality of bus requesters. A GHV can be implemented in software, hardware, or both. A GHV can be located within on-chip register space, on-chip memory space, external memory space, and so on. In embodiments, the checking includes locating a bit position 132, in the GHV, wherein the bit position identifies the last granted requester 134. A GHV can have each bit of its one or more bit positions assigned to a requesting device. Referring back to the example above, a common bus can be coupled to four processor cores and a memory element. Similar to the aforementioned example of an RV, the GHV can include four bits. The first bit can be the rightmost bit of the four bits and can be a least significant bit (LSB). The LSB can be assigned to a first processor. The next bit to the left, the second bit, can be assigned to a second processor. The third and fourth bits can be assigned to other processor cores. The GHV can be used by disclosed embodiments to retain the identity of the last bus requester that was granted access to the common bus. The GHV can be one-hot encoded. One-hot encoding ensures a single active bit among the one or more bit positions in the GHV. The bit position 132 of the single active bit can reveal which bus requester of the one or more bus requesters was the last granted requester 134 (that is, had the most previous access to the common bus). In embodiments, the GHV can be set to an initial value. The initial value can be set to any one-hot value of the GHV. The initial value can be set during a hard reset of the arbitration logic, during a software reset, and so on.

The flow 100 includes creating a relative request vector (RRV) 140, wherein the creating includes performing one or more circular shifts 142 on the RV, wherein the last granted requester does not occupy a first bit position within the RV, wherein a direction of the one or more circular shifts is in a right direction, wherein N represents a number of circular shifts performed. The last granted requester can be indicated by a "1" in the GHV. The circular shifts can be performed until a bit in the RV associated with the last granted requester does not occupy a first bit position in the RV. A circular shift can be associated with a data word that contains two or more bit positions. The data word can contain a bit position defined as the least significant bit (LSB) and a position that is defined as a most significant bit (MSB). The LSB and MSB can be at the limits of the word itself or can be assigned bit positions somewhere within the word. The LSB and the MSB are the bounding limits for the circular shift. Consider the example of an eight-bit register where bit 0 is the rightmost bit and is assigned as the LSB, and bit 7 is the leftmost bit and is assigned as the MSB. A circular shift can occur in a left or right direction. For this example, a circular shift to the left occurs when the original contents of bit 0 is moved to bit 1, the original contents of bit 1 is moved to bit 2, and so on through the remainder of the register bits. The original contents of bit 7, the MSB, are moved to bit 0, the LSB. In another example a circular shift to the right occurs when the original contents of bit 1 are moved to bit 0, the original contents of bit 2 are moved to bit 1, and so on through the remainder of the register bits. The original contents of bit 0, the LSB, are moved to bit 7, the MSB. Moving bits in a register or data word bounded by MSB and LSB can be accomplished for arithmetic, logic, and other operations. In disclosed embodiments, the number of circular shifts performed on the RV can be based on circular shifting, to the right, one or more times, as long as the bit position of the last granted requester does not occupy a first bit position within the RV. In embodiments, the first bit position is a most significant bit position. In other embodiments, the first bit position is a least significant bit position. In embodiments, the creating comprises assigning 144 the RV to the RRV, wherein the last granted requester bit occupies the first bit position within the RV. When the circular shifts have completed as described above, the RV can then be copied to the RRV.

The flow 100 includes examining a first asserted bit within the RRV 150, wherein the examining begins at a second bit position 152 within the RRV, wherein the examining proceeds in a first direction 154. The examining can begin at one end of the RRV and proceed, bit by bit, to discover the first asserted bit (that is, the first bit that is a "1") within the RRV. The first asserted bit can be the priority request that should be granted access by the arbitration. It will be seen that this bit will be carried through the process steps and isolated in a final grant vector by the disclosed technique. As above, the disclosed technique can be accomplished by an incrementing function or a decrementing function. In the case of an incrementing function, the examining for a first asserted bit within the RRV can begin at the LSB within the RRV. The examination can proceed to the left, bit by bit, until an asserted bit (a "1") is encountered. Thus, in embodiments, the second bit position 152 is a least significant bit position. In further embodiments, the first direction 154 is left. In the case of a decrementing function, the examining for a first asserted bit within the RRV can begin at the MSB within the RRV. The examination can proceed to the right, bit by bit, until an asserted bit (a "1") is encountered. Thus, in embodiments, the second bit position 152 is a most significant bit position. In further embodiments, the first direction 154 is right.

The flow 100 includes generating a relative grant vector (RGV) 160, wherein the RGV is based on the first asserted bit within the RRV, wherein the RGV comprises a one-hot encoding. Recall that the examining a first asserted bit can find the first asserted bit which can be the priority request. A one-hot encoded RGV can be generated by making active a single bit in the RGV in the bit position of the first asserted bit examined. The flow 100 includes producing a grant vector (GV) 170, wherein the producing includes executing N circular shifts of the RGV 172, wherein a direction of the executing N circular shifts is in a left direction. The one-hot RGV can be circular shifted 172 N number of times where N was previously defined during the performing one or more circular shifts 142 on the RV. In embodiments, the GV is one-hot encoded. Further, the resulting grant vector can indicate the requester that will be granted access to the common bus. Further embodiments comprise storing the GV 174 as a new GHV. Because the GV is one-hot encoded, the new GHV can also be one-hot encoded and can thus prepare the logic for the next bus request. The flow 100 includes granting access 180, by the arbitration logic, of the common bus to a bus requester indicated by the GV. Recall that bus requests can come from one or more devices connected to a common bus. The common bus can comprise a PCI-E bus, CXL bus, Ethernet, USB, and so on. A single connected device can obtain access to the common bus due to the granting.

Disclosed embodiments provide a system for bus arbitration. Fair access to a bus can be provided for one or more requesters that avoids a single requester dominating bus access. In embodiments, the checking, the creating, the examining, the generating, and the producing are implemented in combinational logic within the arbitration logic. In other embodiments, the checking, the creating, the examining, the generating, and the producing are based on an incrementing function. In other embodiments, the checking, the creating, the examining, the generating, and the producing are based on an incrementing function. In still other embodiments, the checking, the creating, the examining, the generating, and the producing occur in a single clock cycle. The disclosed embodiments can be implemented in hardware, in software, or in a mix of the two. Hardware implementations can include on-chip logic, firmware, and so on. The disclosed embodiments can perform very fast compared to multiple-level decision making trees, state machines, or other logic structures. Fast performance can significantly enhance performance of a computer system.

Various steps in the flow 100 may be changed in order, repeated, omitted, or the like without departing from the disclosed concepts. Various embodiments of the flow 100, or portions thereof, can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
FIG. 2 is a flow diagram for performing circular shifts.
Figure 2:
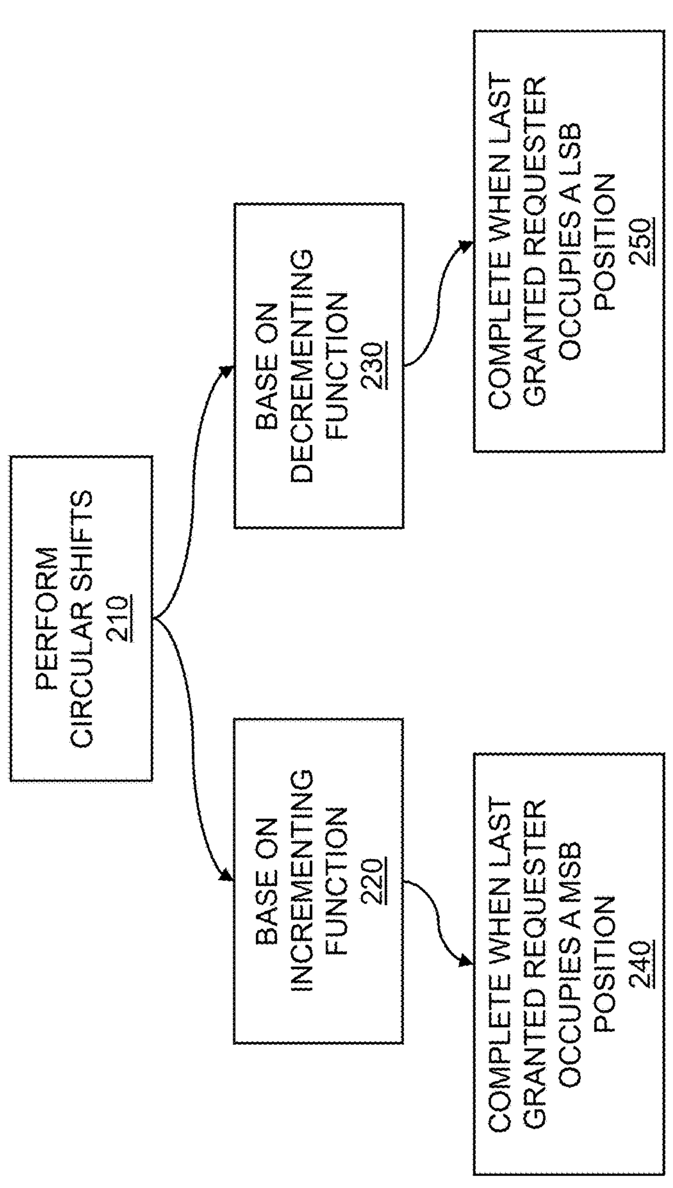

FIG. 2 is a flow diagram for performing circular shifts. As described above, a circular shift can comprise shifting bits in a register to the right or to the left. The circular shift can include wrapping the LSB bit value of the register to the MSB bit position (when shifting to the right), or wrapping the MSB bit value of the register to the LSB position (when shifting to the left). The register can be a hardware or software register, memory locations, and so on. Disclosed embodiments include the use of circular shifts to determine which requester within the plurality of bus requesters should be given access to the common bus.

The flow 200 includes creating a relative request vector (RRV), wherein the creating includes performing one or more circular shifts 210 on the RV, wherein the last granted requester does not occupy a first bit position within the RV, wherein a direction of the one or more circular shifts is in a right direction, wherein N represents a number of circular shifts performed. The RRV can be based on the RV and can comprise the same number of bits as the RV. The circular shifting can be accomplished by hardware, software, or a combination of both. The last granted requester can be the requester which was last granted access to the common bus. The one or more circular shifts 210 can be based on an incrementing function 220. The incrementing function can control the direction in which a bus requester is checked for a request to access the common bus. For example, a common bus can be coupled to three processor cores and one memory element. In this example, the GHV can include three bits. The first (LSB) bit can be assigned to the first processor, the second bit to the second processor, and the third (MSB) bit to the third processor. If the last processor to gain access to the common bus was the first processor, and an incrementing function is used, the arbitration scheme can examine the second processor to determine if a request is outstanding. If no request is pending at the second processor, then the third processor can be checked. The arbitration can thus proceed in a direction from LSB to MSB (to the left) of the GHV. The one or more circular shifts 210 can be based on a decrementing function 230. In the example above, again assuming that the first processor was last to gain access to the common bus, the arbitration scheme can examine the third processor to determine if a request is outstanding. If no request is pending at the third processor, then the second processor can be checked. The arbitration can thus proceed in a direction from MSB to LSB (to the right) of the GHV. Whether an incrementing function or a decrementing function is employed, the direction of the one or more circular shifts 210 can be in a right direction.

The flow 200 includes completing the one or more circular shifts when the last granted requester occupies a most significant bit position with the RRV 240. When the circular shifting is based on an incrementing function, the circular shifting can be considered complete when the last granted requester (as indicated by the GHV) is shifted into the MSB within the RRV. Thus, in embodiments, the first bit position is a most significant bit position.

The flow 200 includes completing the one or more circular shifts when the last granted requester occupies a least significant bit position within the RRV 250. When the circular shifting is based on a decrementing function, the circular shifting can be considered complete when the last granted requester (as indicated by the GHV) is shifted into the LSB within the RRV. Thus, in embodiments, the first bit position is a least significant bit position.

Various steps in the flow 200 may be changed in order, repeated, omitted, or the like without departing from the disclosed concepts. Various embodiments of the flow 200, or portions thereof, can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
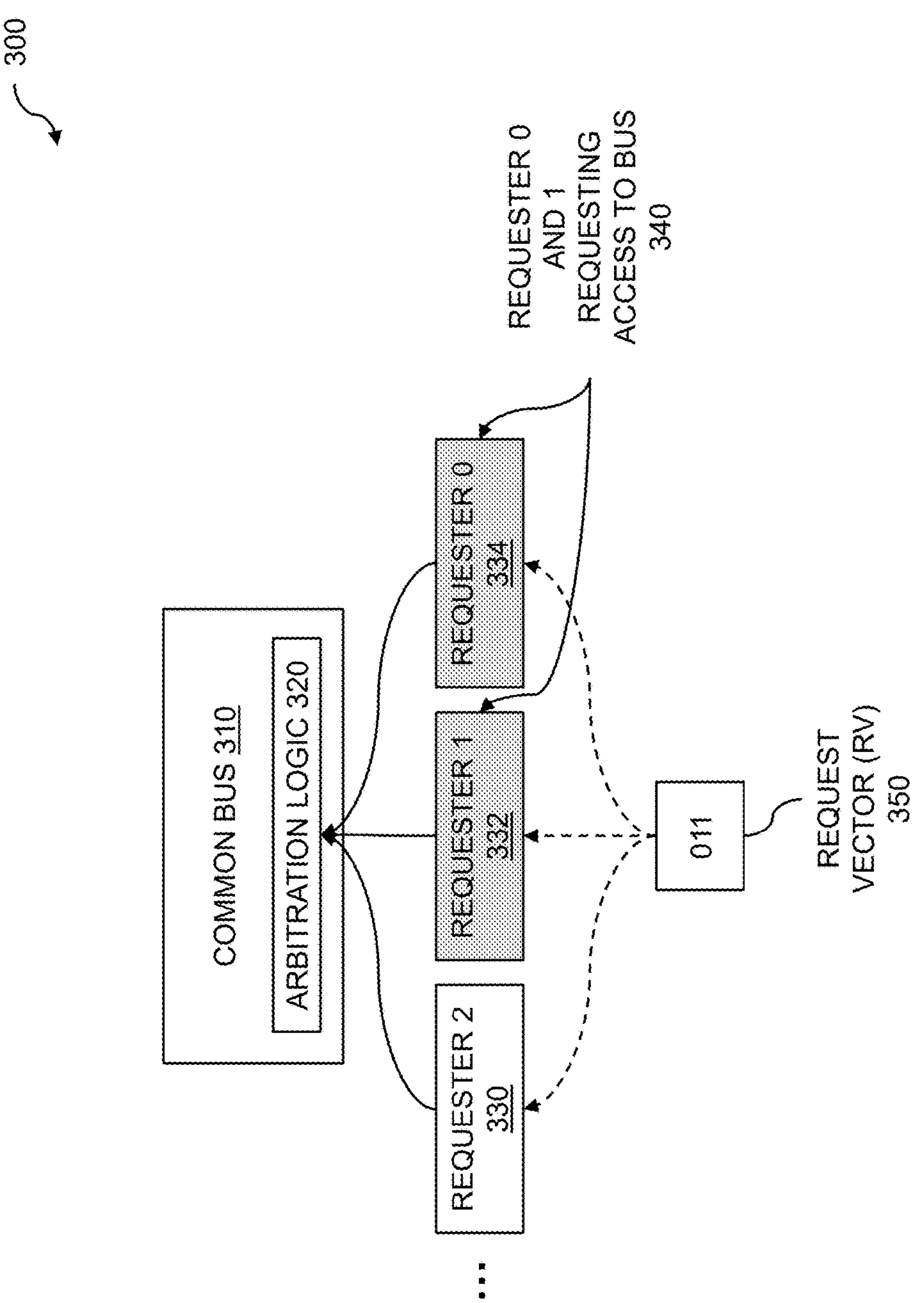
FIG. 3 is an example of a request vector.

FIG. 3 is an example of a request vector. Embodiments include accessing a plurality of bus requesters, wherein the plurality of bus requesters is coupled to a common bus by an arbitration logic. Example 300 includes one or more devices that can be coupled to a common bus 310. The one or more devices can request access to the common bus when they need to perform bus transactions. Examples of bus transactions include a processor core writing to a memory on the common bus, another processor core communicating with an external device on the common bus, and so on. The previously described common bus can be electrically and/or logically configured as PCI-E, CXL, Ethernet, USB, and so on. When coupled to a common bus, access requests can be managed to allow one bus requester access at a time. Example 300 includes arbitration logic 320 that can include hardware circuitry, software logic instructions, or a mix of the two. Arbitration logic can grant orderly bus access based on a bus access protocol. In embodiments, bus access is granted in a round robin technique that avoids domination of the bus by a single requester.

Embodiments include requesting, by at least one bus requester, access to the common bus, wherein the requesting is stored in a request vector (RV) 350. Example 300 includes three bus requesters. Requester 0 can be one of the bus requesters. Requester 0 334 can be one of a plurality of processor cores, a memory, and so on. Requester 1 332 can be one of a plurality of processor cores, a memory, and so on. Requester 2 330 can be one of a plurality of processor cores, a memory, and so on. All or some of the three requesters can be the same or different. In this example, requester 0 and requester 1 are requesting access to the common bus 340, and requester 2 is not requesting access to the common bus. Requester 0 and requester 1 may have issued simultaneous requests for access to the common bus or may have issued requests for bus access displaced in time. Example 300 illustrates the present state of the three requesters 330, 332, and 334. The requester states can be stored in a RV 350. Each requester can be assigned a single bit position. A requester can be identified by the bit position it occupies. Example 300 employs positive logic where a "1" in a bit position will show an active bus request. Request vector 350, therefore, contains "011" to indicate that requester 0 334 and requester 1 332 are requesting access to the common bus, and that requester 2 330 is not requesting access to the common bus. An RV can have zero or more bits active at any one time. Example 300 includes the illustration of three requesters in the RV, but the RV can be any length of one or more bits.

Figure 4:
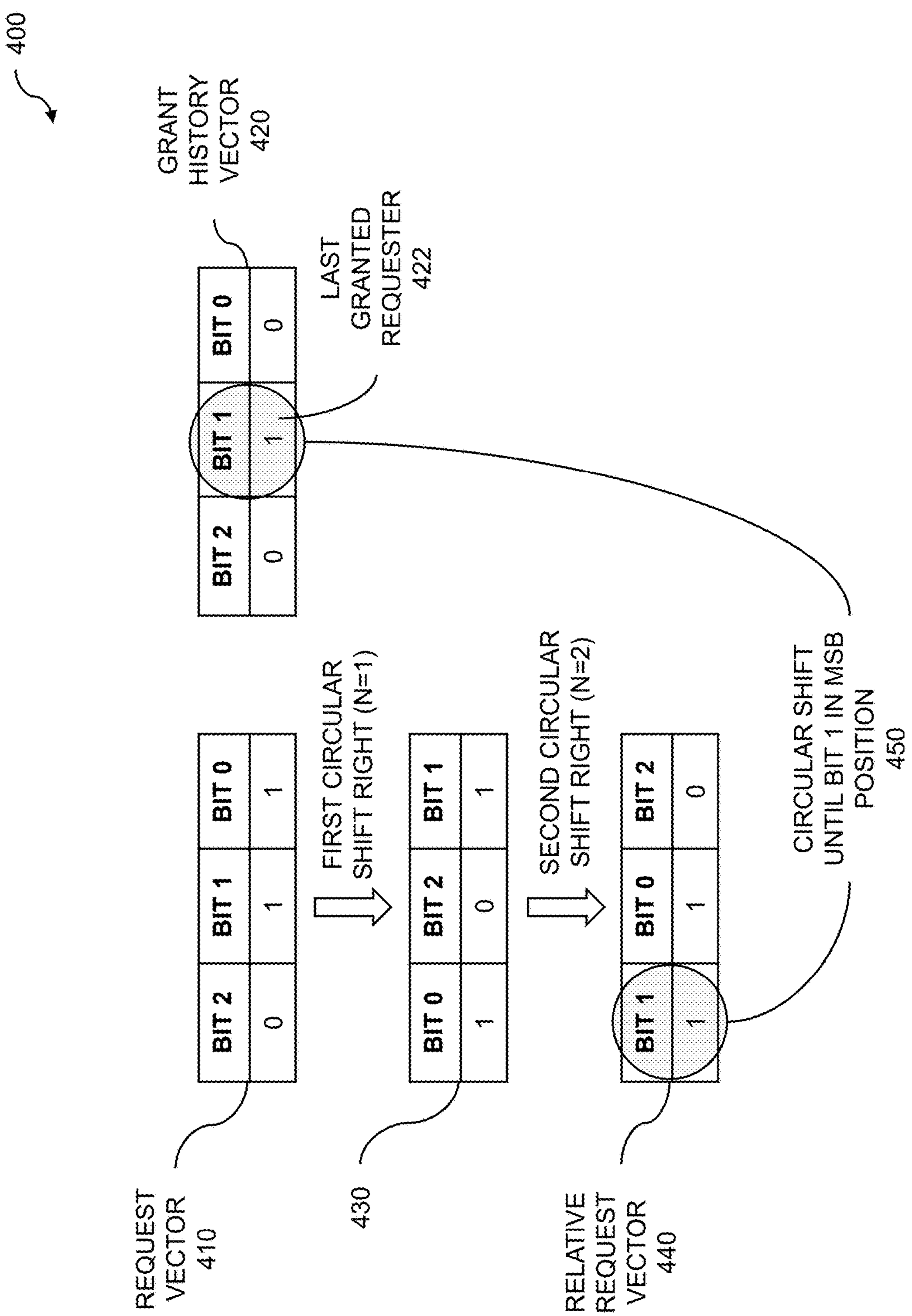
FIG. 4 is an example of generating a relative request vector with an increment function.
Figure 5:
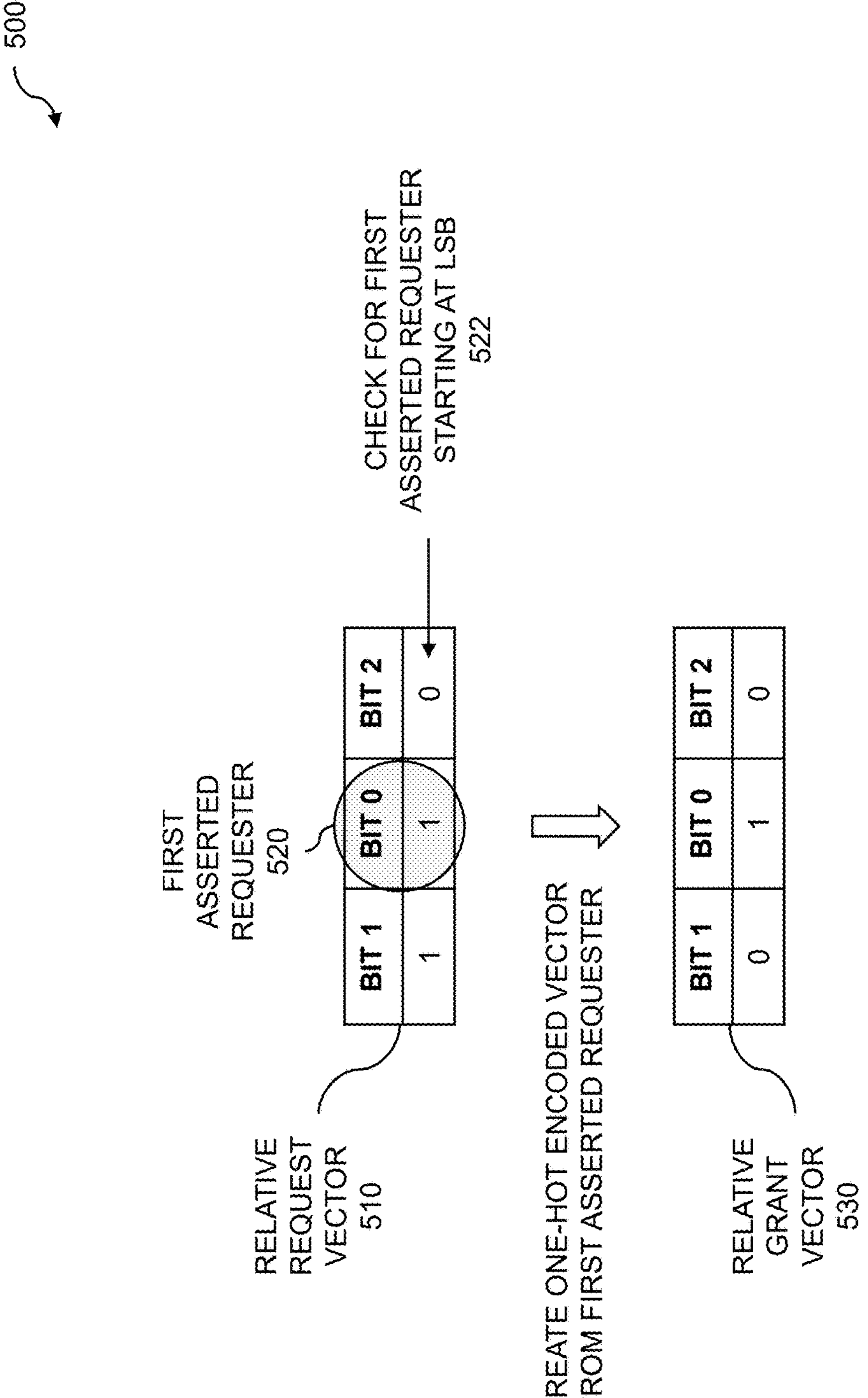
FIG. 5 is an example of generating a relative grant vector with an increment function.
Figure 6:
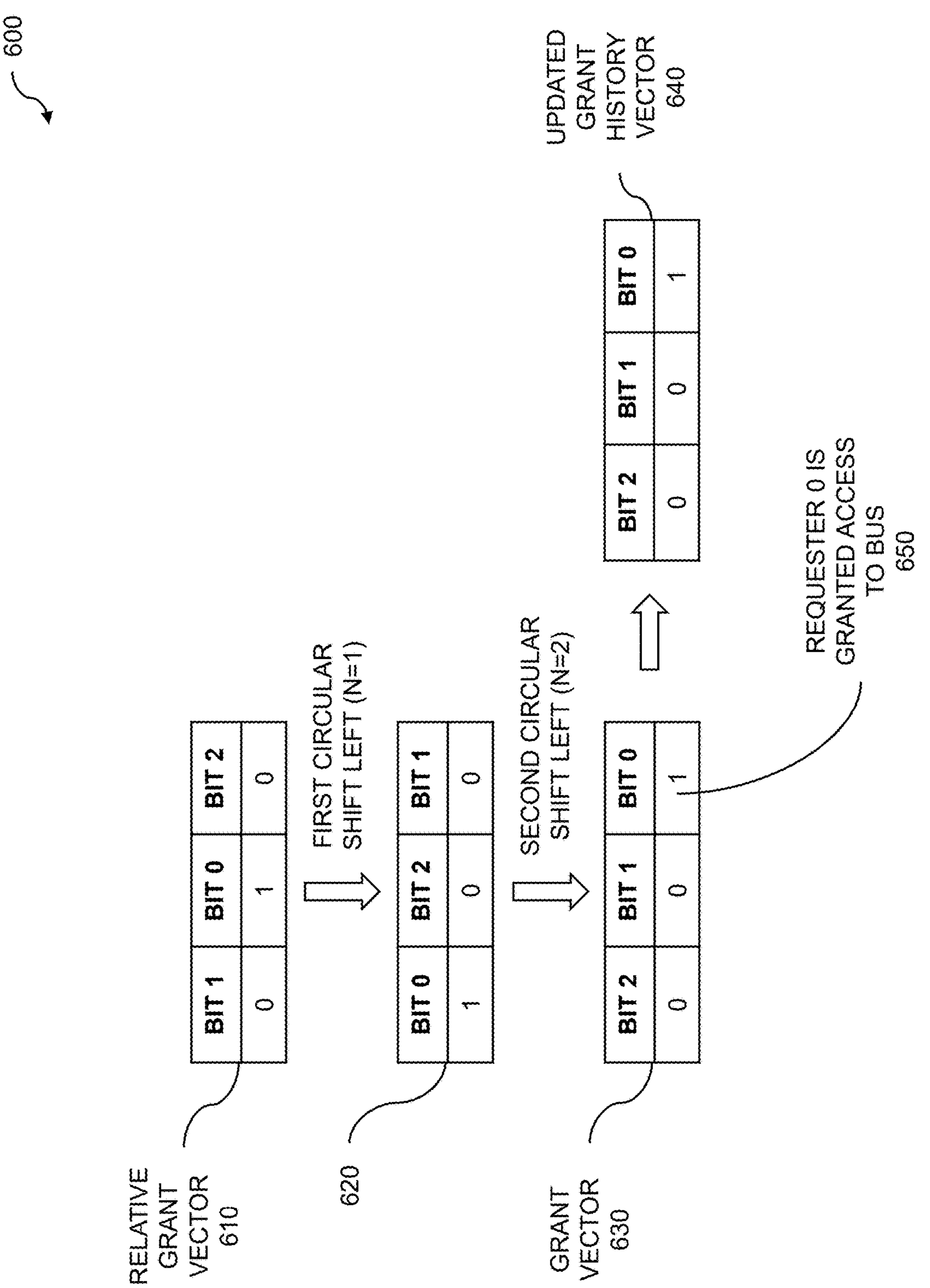
FIG. 6 is an example of generating a grant vector with an increment function.

FIG. 4 is an example of generating a relative request vector with an increment function. FIG. 5 and FIG. 6 will complete the example of the disclosed embodiments using an increment function. Example 400 describes a three-bit request vector (RV) 410 to accommodate three requesters. The requesters as shown in 410 represent the RV 350 of example 300. In this example, the RV contains the bit sequence "011". Note that in RV 410, bit 0 and bit 1, representing requester 0 and requester 1 respectively, are set to "1". This indicates that requester 0 and requester 1 are requesting access to the common bus and requester 2 (bit 2) is not currently requesting access to the common bus. The one-hot grant history vector GHV 420 can be checked to determine the identity of the last bus requester. The identity of the last bus requester 422 can be known by the bit position of the single "1" in the GHV. In GHV 420, bit 1 is set to "1" indicating that requester 1 was the last requester to obtain access to the common bus. Thus, embodiments include checking a grant history vector (GHV) 420, wherein the GHV indicates a last granted requester 422 within the plurality of bus requesters. In other embodiments, the last granted requester comprises a bus requester in the plurality of bus requesters which was granted a most recent access to the common bus.

A relative request vector (RRV) 440 can be created from the RV 410 by performing one or more circular shifts to the right. The circular shifts can continue until the last granted requester is shifted into the MSB position. In example 400, the last granted requester 422 is identified as requester 1 since bit 1 in the GHV 420 is the only bit set to a "1" value. Thus, the RV can be circular shifted to the right until bit 1 (requester 1) is in the MSB position 450. The result of a first circular shift is shown in 430. The first circular shift results in bit states "101". Bit 1 (representing requester 1) now occupies the LSB position. Since bit 1 is not in the MSB position, the circular shifting continues. The result of the second circular shift is shown at 440. The second circular shift results in bit states "110". Bit 1 (representing requester 1) now occupies the MSB position. Since requester 1 was identified by the GHV as the last granted requester, the last granted requester is now in the MSB position after two circular shifts of the RV. Thus, the vector at 440 represents the RRV. Since two circular shifts were required to create the RRV 440, N (the number of circular shifts required) can be equal to 2. Embodiments include creating a relative request vector (RRV) 440, wherein the creating includes performing one or more circular shifts on the RV 410, wherein the last granted requester does not occupy a first bit position within the RV 410, wherein a direction of the one or more circular shifts is in a right direction, wherein N represents a number of circular shifts performed. In embodiments, the performing one or more circular shifts on the RV includes completing the one or more circular shifts when the last granted requester occupies a most significant bit position within the RRV. In embodiments, the first bit position is a most significant bit position. Embodiments include checking a grant history vector (GHV) 420, wherein the GHV indicates a last granted requester 422 within the plurality of bus requesters. In embodiments, the last granted requester comprises a bus requester in the plurality of bus requesters which was granted a most recent access to the common bus.

FIG. 5 is an example of generating a relative grant vector with an increment function. Example 500 illustrates the examining and identifying of the first asserted requester in the relative request vector (RRV). The first asserted bit can be the priority request that will be granted by the arbitration logic. It will be seen that this bit will be carried through the process steps and isolated in a final grant vector by the disclosed technique. Continuing from example 400, the RRV 510 can contain bit states "110". The bit states correspond to requester 1, requester 0, and requester 2, respectively. Due to the circular shifts, the last granted requester (requester 1; represented by bit 1) now occupies the MSB position.

The RRV 510 can be checked for a first asserted bit 522 within the RRV. The first asserted bit can identify the first asserted requester 520. The examination can begin at the LSB and proceeds bit by bit to the left. The first bit examined is the LSB. The LSB is occupied by the original bit 2, or bus requester 2. In this example, it is "0" because requester 2 did not request access 330 to the bus. The next bit to the left is occupied by bus requester 0. In this example it is "1" because requester 0 requested access to the bus (see requester 0 at 334). Thus, bit 0, or bus requester 0, is the first asserted bit in the RRV, and the first asserted requester 520. The RGV 530 can be created by using a one-hot version of the RRV where only bit 0 (the first asserted requester in the RRV starting at the LSB) is set to "1". Thus, the RGV 530 comprises the bits "010".

Embodiments include examining a first asserted bit within the RRV, wherein the examining begins at a second bit position within the RRV, wherein the examining proceeds in a first direction. In embodiments, the second bit position is in a least significant bit position. In further embodiments, the first direction is left. Embodiments further include generating a relative grant vector (RGV), wherein the RGV is based on the first asserted bit within the RRV, wherein the RGV comprises a one-hot encoding.

FIG. 6 is an example of generating a grant vector with an increment function. Example 600 illustrates the producing of a grant vector (GV) from the relative grant vector (RGV). Recall that during the creating of the relative request vector (RRV) in example 400, the number of circular shifts performed, which was represented by N, was 2. That number of shifts will again be performed in the producing of a GV. Previously, the circular shift was performed to the right. Now, the shifts will be performed to the left.

Referring to example 600, the RGV is "010". Bit 1/requester 1 occupies the MSB position, bit 0/requester 0 occupies the bit 1 position, and bit 2/requester 2 occupies the LSB position of the RGV 610. The same number of circular shifts that were performed to create the RRV (N=2) are required to move the bits of the RGV back to their original position where bit 0/requester 0 occupies the LSB position, bit 1/requester 1 occupies the bit 1 position, and bit 2/requester 2 occupies the MSB position. The first circular shift (N=1) of the RGV 610 is shown at 620 with bit states "100". The first circular shift can be to the left. The second circular shift of the bits at 630 results in bit states "001". The result of the second circular shift can be the GV 630. The resulting GV 630 identifies bit 0, or bus requester 0, as gaining access to the common bus 650. Once the GV 630 has been created, the GHV can be updated 640 with the GV. The updating now prepares the arbitration logic for future iterations of granting access to bus requesters.

Embodiments include producing a grant vector (GV), wherein the producing includes executing N circular shifts of the RGV 610, wherein a direction of the executing N circular shifts is in a left direction. Other embodiments include granting access, by the arbitration logic, of the common bus to a bus requester indicated by the GV. Other embodiments include storing the GV as a new GHV.

Figure 7:
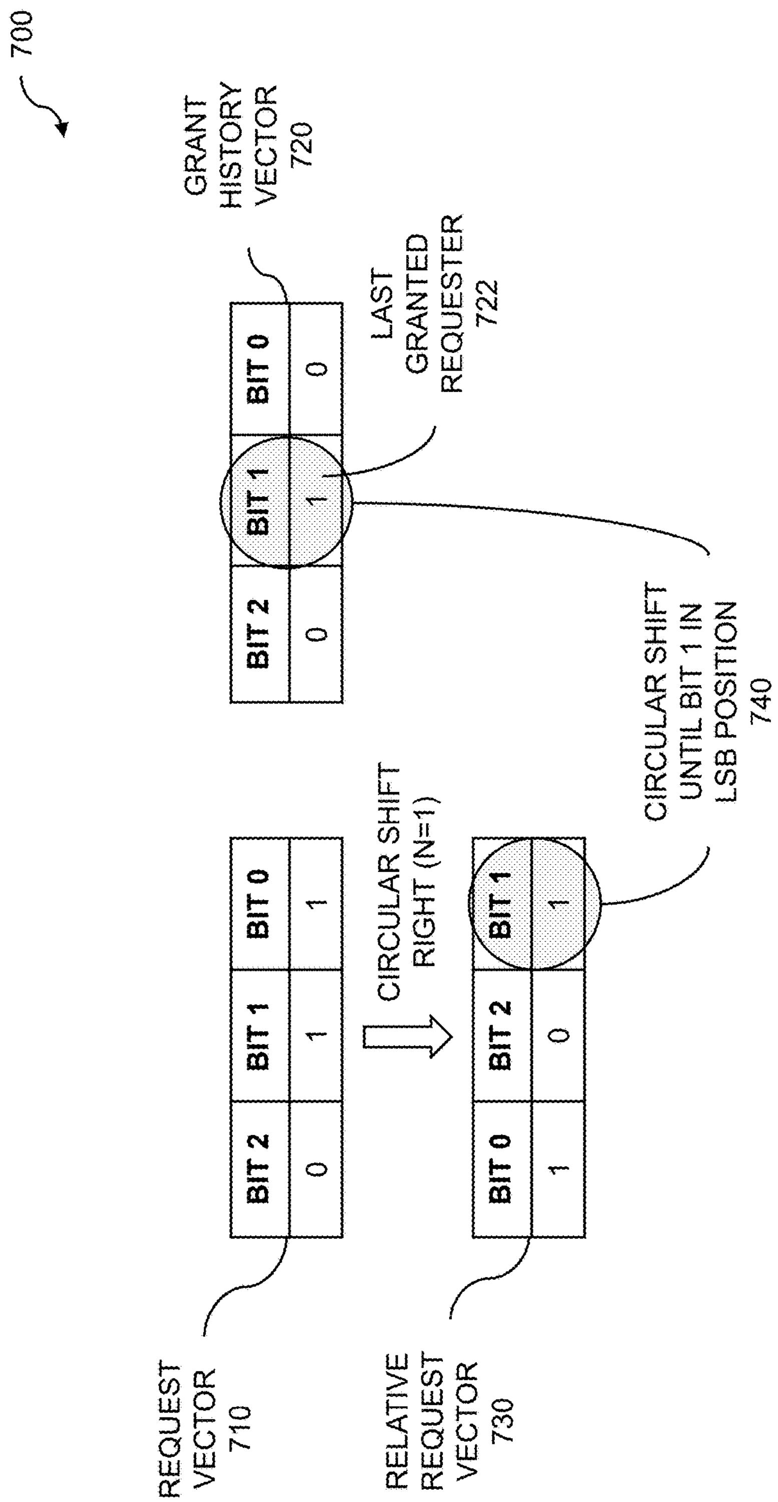
FIG. 7 is an example of generating a relative request vector with a decrement function.
Figure 8:
FIG. 8 is an example of generating a relative grant vector with a decrement function.
Figure 8:
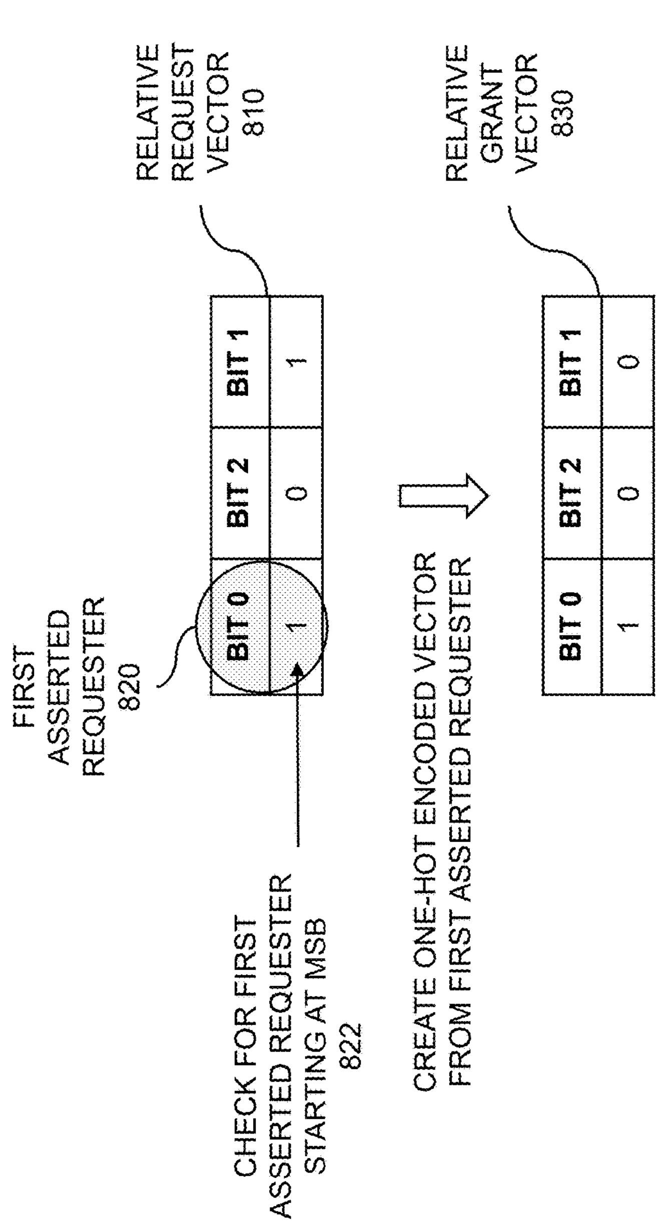
Figure 9:
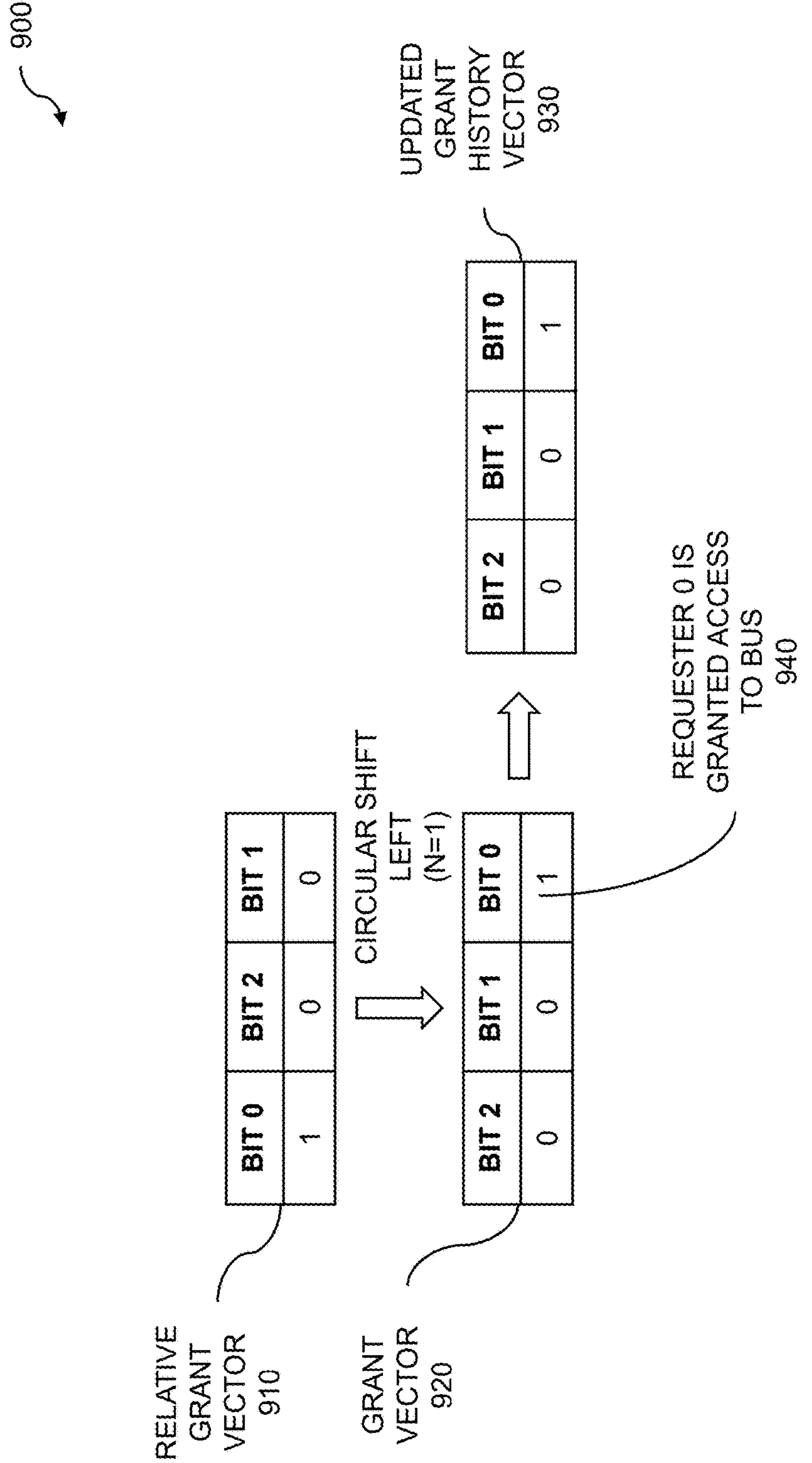
FIG. 9 is an example of generating a grant vector with a decrement function.

FIG. 7 is an example of generating a relative request vector with a decrement function. FIG. 8 and FIG. 9 will complete the example of the disclosed embodiments using a decrement function. Example 700 describes a three-bit request vector (RV) 710 to accommodate three requesters. The requesters as shown in 710 represent the RV 350 of example 300. In this example, the RV contains the bit sequence "011". Note that in RV 710, bit 0 and bit 1, representing requester 0 and requester 1 respectively, are set to "1". This indicates that requester 0 and requester 1 are requesting access to the common bus and requester 2 (bit 2) is not currently requesting access to the common bus. The one-hot grant history vector GHV 720 can be checked to determine the identity of the last bus requester. The identity of the last bus requester 722 can be known by the bit position of the single "1" in the GHV. In GHV 720, bit 1 is set to "1" indicating that requester 1 was the last requester to obtain access to the common bus. Thus, embodiments include checking a grant history vector (GHV) 720, wherein the GHV indicates a last granted requester 722 within the plurality of bus requesters. In other embodiments, the last granted requester comprises a bus requester in the plurality of bus requesters which was granted a most recent access to the common bus.

A relative request vector (RRV) 730 can be created from the RV 710 by performing one or more circular shifts to the right. The circular shifts can continue until the last granted requester is shifted into the LSB position. In example 700, the last granted requester 722 is identified as requester 1 since bit 1 in the GHV 720 is the only bit set to a "1" value. Thus, the RV can be circular shifted to the right until bit 1 (requester 1) is in the LSB position 740. The result of a first circular shift is shown in 730. The first circular shift results in bit states "101". Since bit 1 (representing requester 1) now occupies the LSB position, no further circular shifts are required. Thus, the vector at 730 represents the RRV. Since one circular shift was required to create the RRV, N (the number of circular shifts required) can be equal to 1. Embodiments include creating a relative request vector (RRV) 730, wherein the creating includes performing one or more circular shifts on the RV 710, wherein the last granted requester does not occupy a first bit position within the RV 710, wherein a direction of the one or more circular shifts is in a right direction, wherein N represents a number of circular shifts performed. In embodiments, the first bit position is a least significant bit position. Embodiments include checking a grant history vector (GHV) 720, wherein the GHV indicates a last granted requester 722 within the plurality of bus requesters. In embodiments, the last granted requester comprises a bus requester in the plurality of bus requesters which was granted a most recent access to the common bus.

FIG. 8 is an example of generating a relative grant vector with a decrement function. Example 800 illustrates the examining and identifying the first asserted requester in the relative request vector (RRV). The first asserted bit can be the priority request that will be granted by the arbitration logic. It will be seen that this bit will be carried through the process steps and will be isolated in a final grant vector by the disclosed technique. Continuing from example 700, the RRV 810 can contain bit states "101". The bit states correspond to requester 0, requester 2, and requester 1, respectively. Due to the circular shifts, the last granted requester (requester 1; represented by bit 1) now occupies the LSB position.

The RRV 810 can be checked for a first asserted bit 822 within the RRV. The first asserted bit can identify the first asserted requester 820. The examination can begin at the MSB and proceeds bit by bit to the right. The first bit examined is the MSB. The MSB is occupied by the original bit 0, or bus requester 0. In this example it is "1" because requester 0 requested access to the bus. Thus, bit 0, or bus requester 0, is the first asserted bit in the RRV, and the first asserted requester 820. The RGV 830 can be created by creating a one-hot version of the RRV where only bit 0 (the first asserted requester in the RRV starting at the MSB) is set to "1". Thus, the RGV 830 comprises the bits "100".

Embodiments include examining a first asserted bit within the RRV, wherein the examining begins at a second bit position within the RRV, wherein the examining proceeds in a first direction. In embodiments, the performing one or more circular shifts on the RV includes completing the one or more circular shifts when the last granted requester occupies a least significant bit position within the RRV. In embodiments, the second bit position is a most significant bit position. In further embodiments, the first direction is right. Embodiments further include generating a relative grant vector (RGV), wherein the RGV is based on the first asserted bit within the RRV, wherein the RGV comprises a one-hot encoding.

FIG. 9 is an example of generating a grant vector with a decrement function. Example 900 illustrates the producing of a grant vector (GV) from the relative grant vector (RGV). Recall that during the creating of the relative request vector (RRV) in example 700, the number of circular shifts performed, which was represented by N, was 1. That number of shifts will again be performed in producing a GV. Previously, the circular shift was performed to the right. Now, the circular shifts will be performed to the left.

Referring to example 900, the RGV 910 is "100". Bit 0/requester 0 occupies the MSB position, bit 2/requester 2 occupies the bit 1 position, and bit 1/requester 1 occupies the LSB position of the RGV 910. The same number of circular shifts that were performed to create the RRV (N=1) are required to move the bits of the RGV back to their original position where bit 0/requester 0 occupies the LSB position, bit 1/requester 1 occupies the bit 1 position, and bit 2/requester 2 occupies the MSB position. The first circular shift (N=1) of the RGV 910 is shown at 920 with bit states "001". The first circular shift can be to the left. The result of the second circular shift can be the GV 920. The resulting GV 920 identifies bit 0, or bus requester 0, as gaining access to the common bus 940. Once the GV 920 has been created, the GHV can be updated 930 with the GV. The updating now prepares the arbitration logic for future iterations of granting access to bus requesters.

Embodiments include producing a grant vector (GV), wherein the producing includes executing N circular shifts of the RGV 910, wherein a direction of the executing N circular shifts is in a left direction. Other embodiments include granting access, by the arbitration logic, of the common bus to a bus requester indicated by the GV. Other embodiments include storing the GV as a new GHV.

Figure 10:
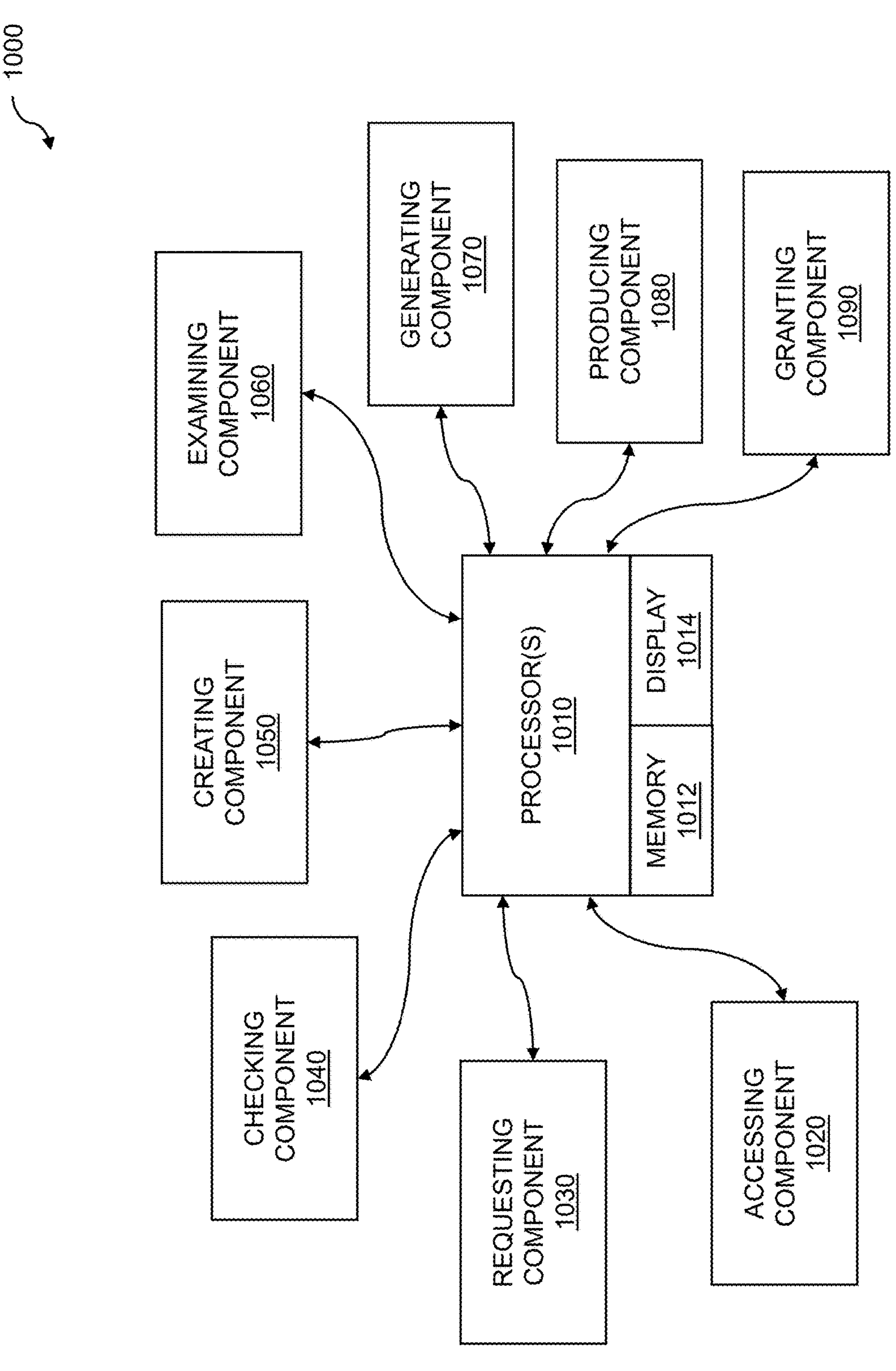
FIG. 10 is a system diagram for round-robin bus arbitration with control vectors and increment and decrement functions.

FIG. 10 is a system diagram for round robin bus arbitration with control vectors and increment and decrement functions. The purpose of the disclosed technique is to enable and provision the process of fast bus arbitration. It employs a round robin strategy with circular shifting that allows the use of combinational logic alone that executes in one cycle. The system 1000 comprises a system that can contain one or more processors 1010 or processor cores. The one or more processors or processor cores can include processors on-chip, system-on-a-chip (SOC) processors, cores that are embedded in application specific integrated circuits (ASICs), soft processors that are implemented in an FPGA chip, and so on. The one or more processors 1010 can be coupled to a memory 1012. Memories can be one or more storage units such as volatile and non-volatile semiconductor memories, cache memory structures, main memory, secondary memory, and more. The one or more processors 1010 can be coupled to a display 1014 and other human interface devices (HIDs) such as a keyboard. HIDs can include a video display that displays operational status of system functionality, operating data, and other parameters. A video display can be used as a debug tool for displaying bus performance, system status, and so on. The processor(s) 1010, the memory 1012, and the display 1014 can reside in multiple and disparate networked locations, or can reside in a single location implemented as a laptop computer, desktop computer, etc.

The system 1000 includes an accessing component 1020. Embodiments include accessing a plurality of bus requesters, wherein the plurality of bus requesters is coupled to a common bus by an arbitration logic. Requests are made by a plurality of devices on the bus that request access to the bus. Access can include memory access, CPU core access, and so on. The devices are coupled to a common bus by an arbitration logic. Connected bus requesters can include one or more devices that need to access one or more memories, one or more processors, one or more input-output devices, and so on. Common buses can include buses that are internal or external to a computer system. In embodiments, the common bus comprises a PCI-E bus. In further embodiments, the common bus comprises a compute express link (CXL) bus. In other embodiments, the common bus comprises an ethernet bus. In additional embodiments, the common bus comprises a universal serial bus (USB). A common bus can comprise other high speed bus structures and protocols. Arbitration logic in disclosed embodiments can coordinate accesses to the common bus by the various bus requesters. Arbitration logic can be implemented in software, hardware, or a combination of the two. Arbitration logic can be implemented as a single centralized logic structure that performs bus arbitration across the entire set of connected bus requesters. Arbitration logic can also be implemented as a distributed system of logic that includes the connected bus requesters in the arbitration process. The arbitration logic can comprise a state machine.

The system 1000 includes a requesting component 1030. Embodiments include requesting, by at least one bus requester, access to the common bus, wherein the requesting is stored in a request vector (RV). A bus requester can request access to the common bus. One or more requesters can request access to the common bus at the same time. A bus request can be stored in a request vector (RV). An RV can comprise one or more bits. An RV can have each bit of the one or more bits assigned to a requesting device. A requesting device that requires access to the common bus will make the bit active at its assigned bit position in the RV. More than one bus requester on the common bus can request access at a time. The RV can be an input signal that can be used by the disclosed technique to coordinate and grant access for the requesting device to the common bus.

The system 1000 includes a checking component 1040. Embodiments include checking a grant history vector (GHV), wherein the GHV indicates a last granted requester within the plurality of bus requesters. A GHV can be implemented in software, hardware, or both. A GHV can be located within on-chip register space, on-chip memory space, external memory space, and so on. In embodiments, the checking includes locating a bit position, in the GHV, wherein the bit position identifies the last granted requester. A GHV can have each bit of its one or more bit positions assigned to a requesting device. Multiple requesting devices can include processor cores, memories, input-output devices, and so on. The GHV can be used by disclosed embodiments to retain the identity of the last bus requester that was granted access to the common bus. The GHV can be one-hot encoded. One-hot encoding ensures a single active bit among the one or more bit positions in the GHV. A one-hot encoded value is easy to check because decoding is not necessary. The single active bit can reveal, based on the bit position, which bus requester of the one or more bus requesters last accessed the common bus.

The system 1000 includes a creating component 1050. Embodiments include creating a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed. The number of circular shifts is based on circular shifting, to the right, one or more times while the bit position of the last granted requester does not occupy a first bit position within the RV.

The creating can include an incrementing function. When the incrementing function is included, in embodiments, the first bit position is a most significant bit position. In further embodiments, the performing one or more circular shifts on the RV includes completing the one or more circular shifts when the last granted requester occupies a most significant bit position within the RRV. The creating can include a decrementing function. When the decrementing function is included, in embodiments, the first bit position is a least significant bit position. In further embodiments, the performing one or more circular shifts on the RV includes completing the one or more circular shifts when the last granted requester occupies a least significant bit position within the RRV.

The system 1000 includes an examining component 1060. Embodiments include examining a first asserted bit within the RRV, wherein the examining begins at a second bit position within the RRV, wherein the examining proceeds in a first direction. The first asserted bit can be the priority request that needs to be granted by the disclosed technique. It will be seen that this bit will be carried through the process steps and isolated in a final grant vector by the disclosed technique. The disclosed technique starts examining at one end of the RRV and proceeds, bit by bit, to discover the first asserted bit. As previously described, the disclosed technique can be accomplished by an incrementing function or a decrementing function. In embodiments, for an incrementing function, the second bit position is a least significant bit position. In further embodiments, for an incrementing function, the first direction is left. In embodiments, for a decrementing function, the second bit position is a most significant bit position. In further embodiments, for a decrementing function, the first direction is right.

The system 1000 includes a generating component 1070. Embodiments include generating a relative grant vector (RGV), wherein the RGV is based on the first asserted bit within the RRV, wherein the RGV comprises a one-hot encoding. The first asserted bit in the RRV can be the priority request. A one-hot RGV can be generated by making active a single bit in the vector in the bit position of the first asserted bit examined in the RRV. The RRV maintains the bit ordering of the one or more requesters in the RRV, but the absolute bit positions can be relative due to the circular shifting.

The system 1000 includes a producing component 1080. Embodiments include producing a grant vector (GV), wherein the producing includes executing N circular shifts of the RGV, wherein a direction of the executing N circular shifts is in a left direction. The one-hot RGV can be circular shifted N number of times, where N was previously derived during the creating a relative request vector (RRV) and performing one or more circular shifts on the RV. The producing can yield the bit position within the one-hot encoded grant vector that identifies the next requester to be granted access to the common bus. Further embodiments comprise storing the GV as a new GHV. Because the GV is one-hot encoded, the new GHV can also be one-hot encoded and can be thus prepared for the next bus request and subsequent checking of a GHV. In embodiments the checking, the creating, the examining, the generating, and the producing are based on an incrementing function. In embodiments, for an incrementing function, the first bit position is a most significant bit position. In other embodiments, for an incrementing function, the performing one or more circular shifts on the RV includes completing the one or more circular shifts when the last granted requester occupies a most significant bit position within the RRV. In other embodiments, the checking, the creating, the examining, the generating, and the producing are based on a decrementing function. In embodiments, for a decrementing function, the first bit position is a least significant bit position. In other embodiments, for a decrementing function, the performing one or more circular shifts on the RV includes completing the one or more circular shifts when the last granted requester occupies a least significant bit position within the RRV.

The system 1000 includes a granting component 1090. Embodiments include granting access, by the arbitration logic, of the common bus to a bus requester indicated by the GV. Recall that bus requests can come from one or more devices connected to a common bus. The common bus can comprise a PCI-E bus, CXL bus, Ethernet, USB, and so on. A single connected device will have access to the common bus due to this bus granting. Access can be granted with combinational logic, hardware circuitry, of a combination of the two. In embodiments, the checking, the creating, the examining, the generating, and the producing occur in a single clock cycle.

The system 1000 can include a computer program product embodied in a non-transitory computer readable medium for instruction execution, the computer program product comprising code which causes one or more processors to generate semiconductor logic for: accessing a plurality of bus requesters, wherein the plurality of bus requesters is coupled to a common bus by an arbitration logic; requesting, by at least one bus requester, access to the common bus, wherein the requesting is stored in a request vector (RV); checking a grant history vector (GHV), wherein the GHV indicates a last granted requester within the plurality of bus requesters; creating a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed; examining a first asserted bit within the RRV, wherein the examining begins at a second bit position within the RRV, wherein the examining proceeds in a first direction; generating a relative grant vector (RGV), wherein the RGV is based on the first asserted bit within the RRV, wherein the RGV comprises a one-hot encoding; producing a grant vector (GV), wherein the producing includes executing N circular shifts of the RGV, wherein a direction of the executing N circular shifts is in a left direction; and granting access, by the arbitration logic, of the common bus to a bus requester indicated by the GV.

The system 1000 can include a computer system for instruction execution comprising: a memory which stores instructions; one or more processors coupled to the memory wherein the one or more processors, when executing the instructions which are stored, are configured to: access a plurality of bus requesters, wherein the plurality of bus requesters is coupled to a common bus by an arbitration logic; request, by at least one bus requester, access to the common bus, wherein the requesting is stored in a request vector (RV); check a grant history vector (GHV), wherein the GHV indicates a last granted requester within the plurality of bus requesters; create a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed; examine a first asserted bit within the RRV, wherein the examining begins at a second bit position within the RRV, wherein the examining proceeds in a first direction; generate a relative grant vector (RGV), wherein the RGV is based on the first asserted bit within the RRV, wherein the RGV comprises a one-hot encoding; produce a grant vector (GV), wherein the producing includes executing N circular shifts of the RGV, wherein a direction of the executing N circular shifts is in a left direction; and grant access, by the arbitration logic, of the common bus to a bus requester indicated by the GV.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagram and flow diagram illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc;

an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

It will be appreciated that computer program instructions may include computer executable code. A variety of languages for expressing computer program instructions may include without limitation C, C++, Java, JavaScript, assembly language, Lisp, Perl, Tcl, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A processor-implemented method for resource sharing comprising:

accessing a plurality of bus requesters, wherein the plurality of bus requesters is coupled to a common bus by an arbitration logic;

requesting, by at least one bus requester, access to the common bus, wherein the requesting is stored in a request vector (RV);

checking a grant history vector (GHV), wherein the GHV indicates a last granted requester within the plurality of bus requesters;

creating a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed;

examining a first asserted bit within the RRV, wherein the examining begins at a second bit position within the RRV, wherein the examining proceeds in a first direction;

generating a relative grant vector (RGV), wherein the RGV is based on the first asserted bit within the RRV, wherein the RGV comprises a one-hot encoding;

producing a grant vector (GV), wherein the producing includes executing N circular shifts of the RGV, wherein a direction of the executing N circular shifts is in a left direction; and granting access, by the arbitration logic, of the common bus to a bus requester indicated by the GV.

2. The method of claim 1 wherein the checking, the creating, the examining, the generating, and the producing are based on an incrementing function.

3. The method of claim 2 wherein the first bit position is a most significant bit position.

4. The method of claim 3 wherein the performing one or more circular shifts on the RV includes completing the one or more circular shifts when the last granted requester occupies a most significant bit position within the RRV.

5. The method of claim 4 wherein the second bit position is a least significant bit position.

6. The method of claim 5 wherein the first direction is left.

7. The method of claim 1 wherein the checking, the creating, the examining, the generating, and the producing are based on a decrementing function.

8. The method of claim 7 wherein the first bit position is a least significant bit position.

9. The method of claim 8 wherein the performing one or more circular shifts on the RV includes completing the one or more circular shifts when the last granted requester occupies a least significant bit position within the RRV.

10. The method of claim 9 wherein the second bit position is a most significant bit position.

11. The method of claim 10 wherein the first direction is right.

12. The method of claim 1 further comprising storing the GV as a new GHV.

13. The method of claim 1 wherein the checking includes locating a bit position, in the GHV, wherein the bit position identifies the last granted requester.

14. The method of claim 1 wherein the GHV comprises a number of bits, wherein the number of bits is equal to a number of bus requesters in the plurality of bus requesters.

15. The method of claim 1 wherein the GV is one-hot encoded.

16. The method of claim 1 wherein the common bus comprises a PCI-Express (PCI-E) bus.

17. The method of claim 1 wherein the common bus comprises a compute express link (CXL) bus.

18. The method of claim 1 wherein the common bus comprises an ethernet bus.

19. The method of claim 1 wherein the common bus comprises a universal serial bus (USB).

20. The method of claim 1 wherein the checking, the creating, the examining, the generating, and the producing are implemented in combinational logic within the arbitration logic.

21. The method of claim 1 wherein the checking, the creating, the examining, the generating, and the producing occur in a single clock cycle.

22. The method of claim 1 wherein the last granted requester comprises a bus requester in the plurality of bus requesters which was granted a most recent access to the common bus.

23. The method of claim 1 wherein the creating comprises assigning the RV to the RRV, wherein the last granted requester bit occupies the first bit position within the RV.

24. A computer program product embodied in a non-transitory computer readable medium for instruction execution, the computer program product comprising code which causes one or more processors to generate semiconductor logic for:

accessing a plurality of bus requesters, wherein the plurality of bus requesters is coupled to a common bus by an arbitration logic;

requesting, by at least one bus requester, access to the common bus, wherein the requesting is stored in a request vector (RV);

checking a grant history vector (GHV), wherein the GHV indicates a last granted requester within the plurality of bus requesters;

creating a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed;

examining a first asserted bit within the RRV, wherein the examining begins at a second bit position within the RRV, wherein the examining proceeds in a first direction;

generating a relative grant vector (RGV), wherein the RGV is based on the first asserted bit within the RRV, wherein the RGV comprises a one-hot encoding;

producing a grant vector (GV), wherein the producing includes executing N circular shifts of the RGV, wherein a direction of the executing N circular shifts is in a left direction; and granting access, by the arbitration logic, of the common bus to a bus requester indicated by the GV.

25. A computer system for instruction execution comprising:

a memory which stores instructions;

one or more processors coupled to the memory wherein the one or more processors, when executing the instructions which are stored, are configured to:

access a plurality of bus requesters, wherein the plurality of bus requesters is coupled to a common bus by an arbitration logic;

request, by at least one bus requester, access to the common bus, wherein the requesting is stored in a request vector (RV);

check a grant history vector (GHV), wherein the GHV indicates a last granted requester within the plurality of bus requesters;

create a relative request vector (RRV), wherein the creating includes performing one or more circular shifts on the RV, wherein the last granted requester does not occupy a first bit position within the RV, wherein a direction of the one or more circular shifts is in a right direction, wherein N represents a number of circular shifts performed;

examine a first asserted bit within the RRV, wherein the examining begins at a second bit position within the RRV, wherein the examining proceeds in a first direction;

generate a relative grant vector (RGV), wherein the RGV is based on the first asserted bit within the RRV, wherein the RGV comprises a one-hot encoding;

produce a grant vector (GV), wherein the producing includes executing N circular shifts of the RGV, wherein a direction of the executing N circular shifts is in a left direction; and grant access, by the arbitration logic, of the common bus to a bus requester indicated by the GV.

* * * * *